UNITED STATES PATENT OFFICE.

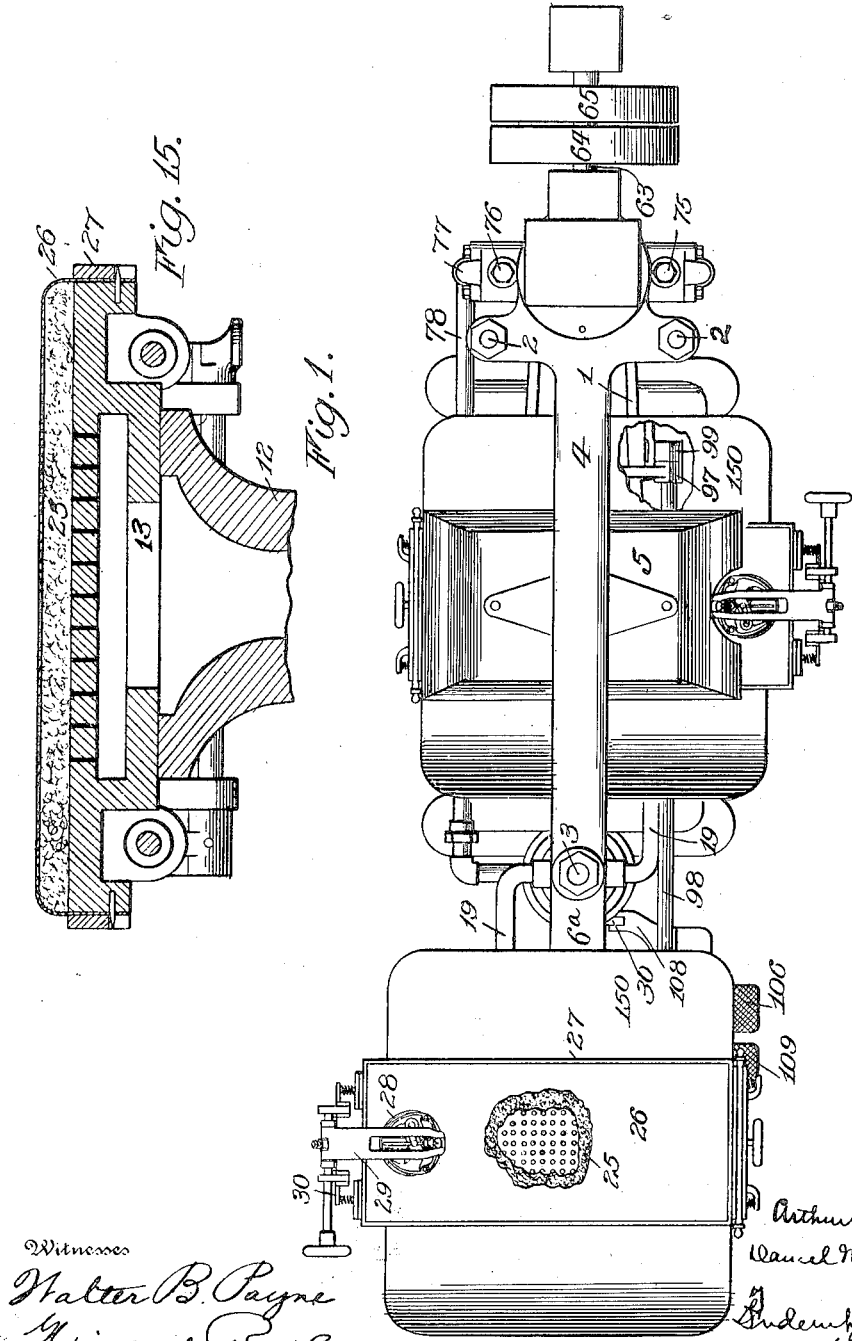

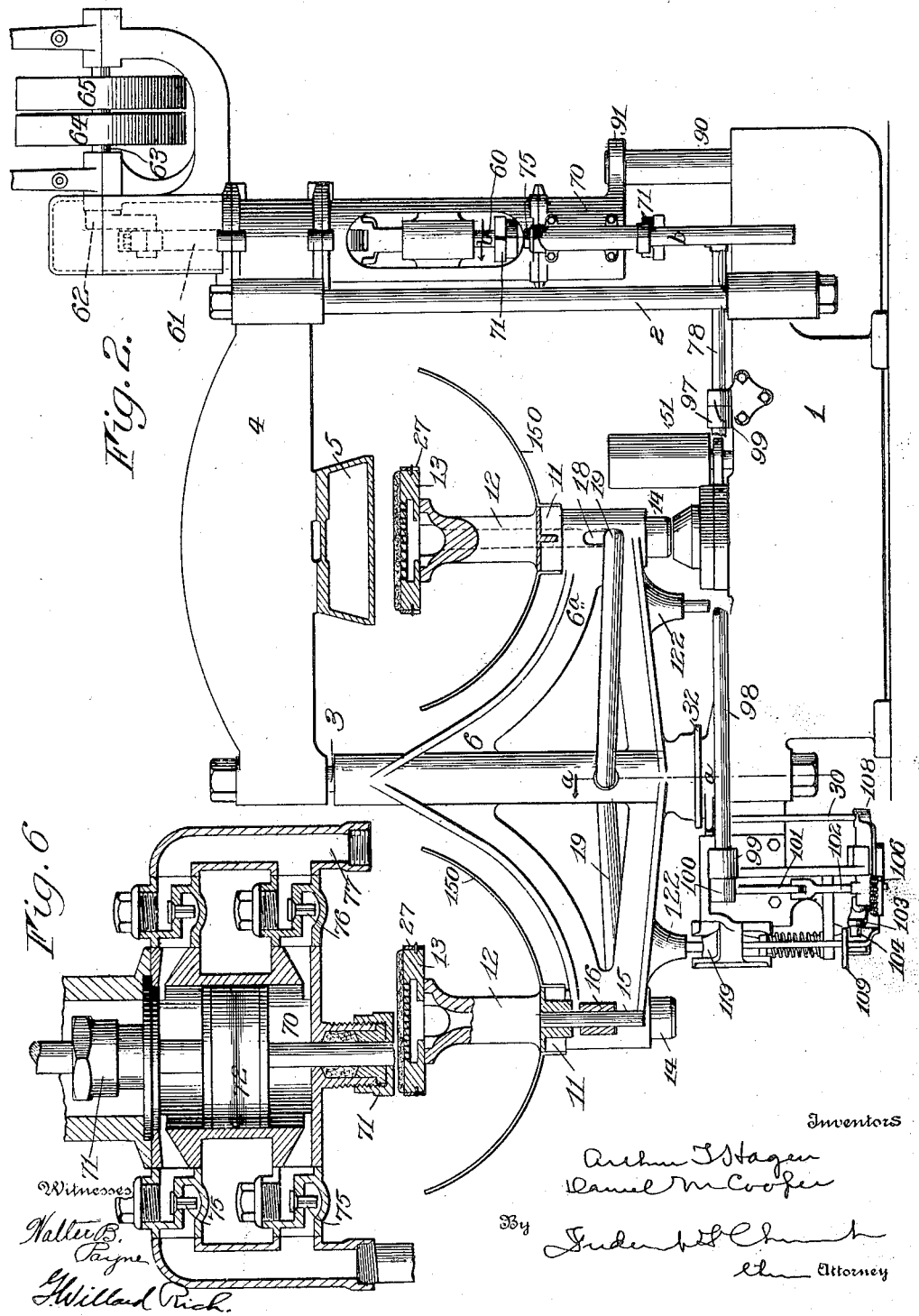

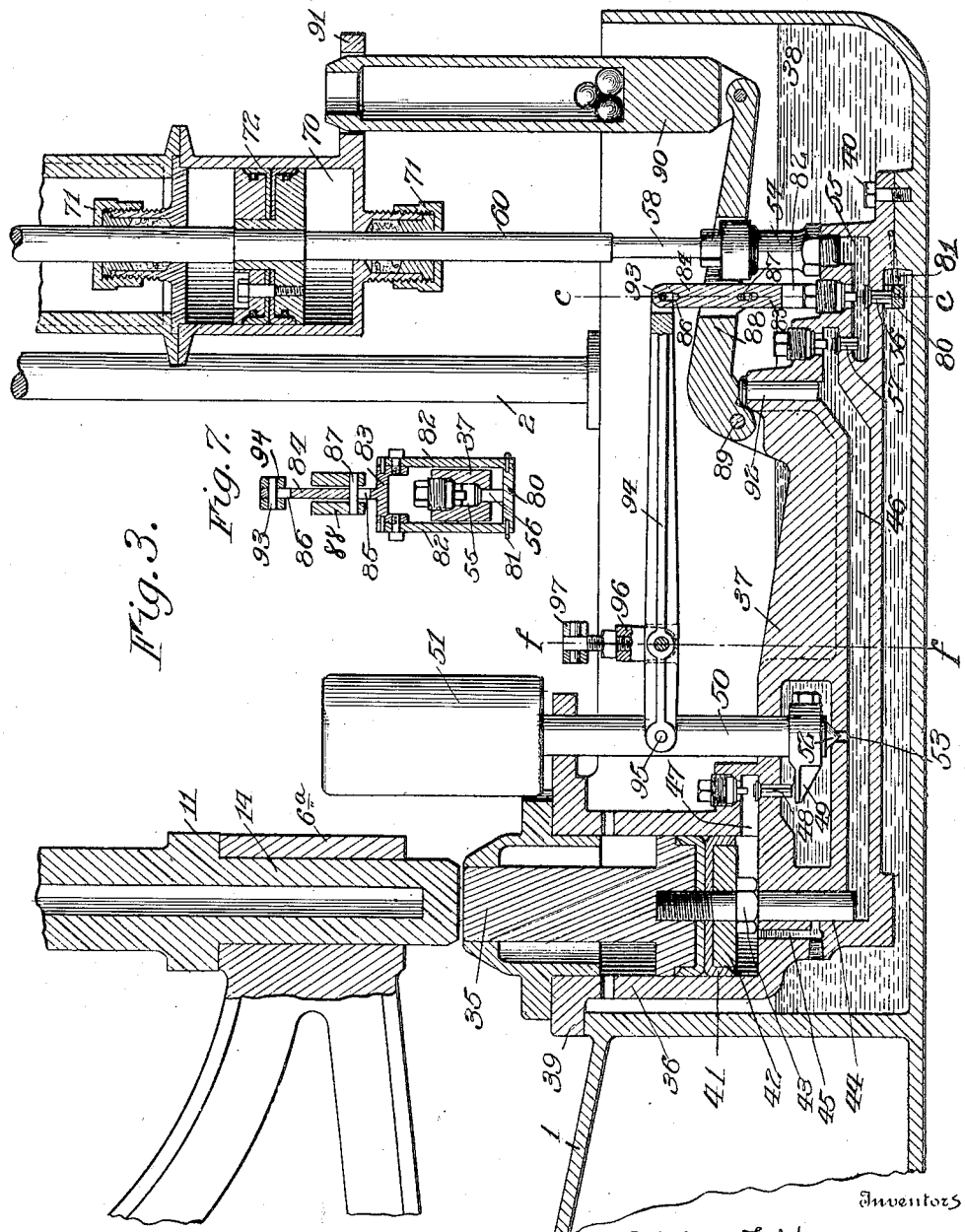

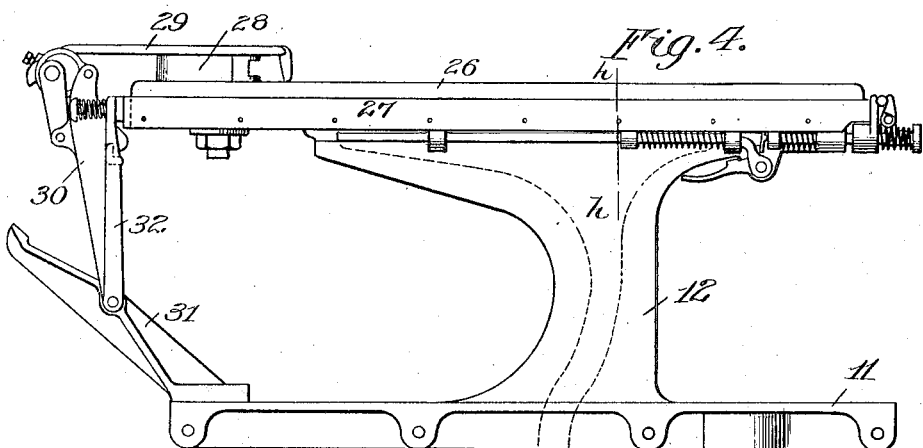
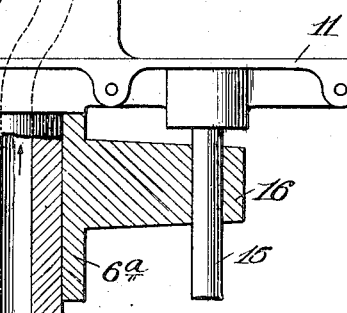
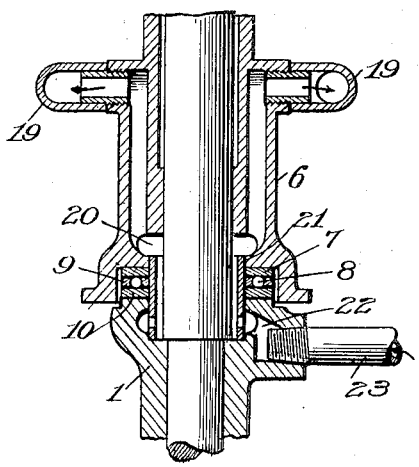
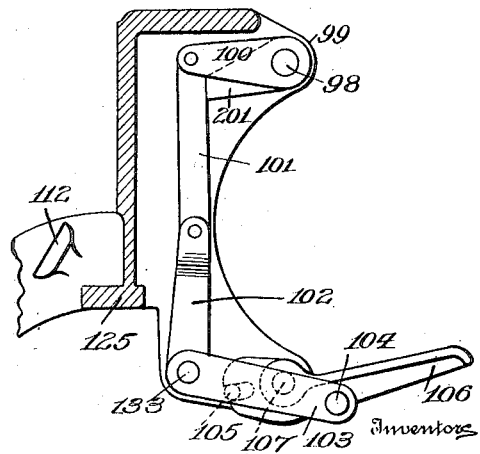

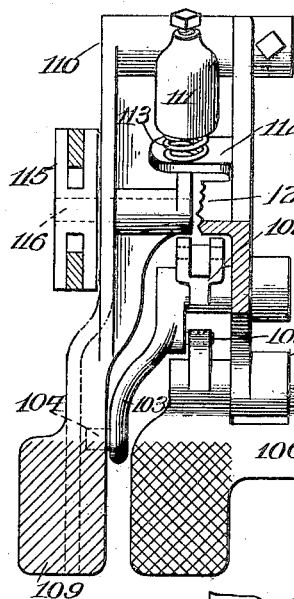
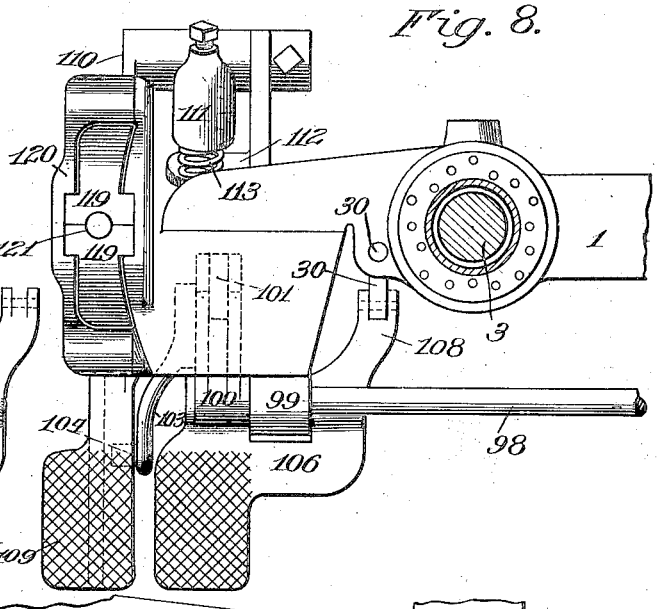
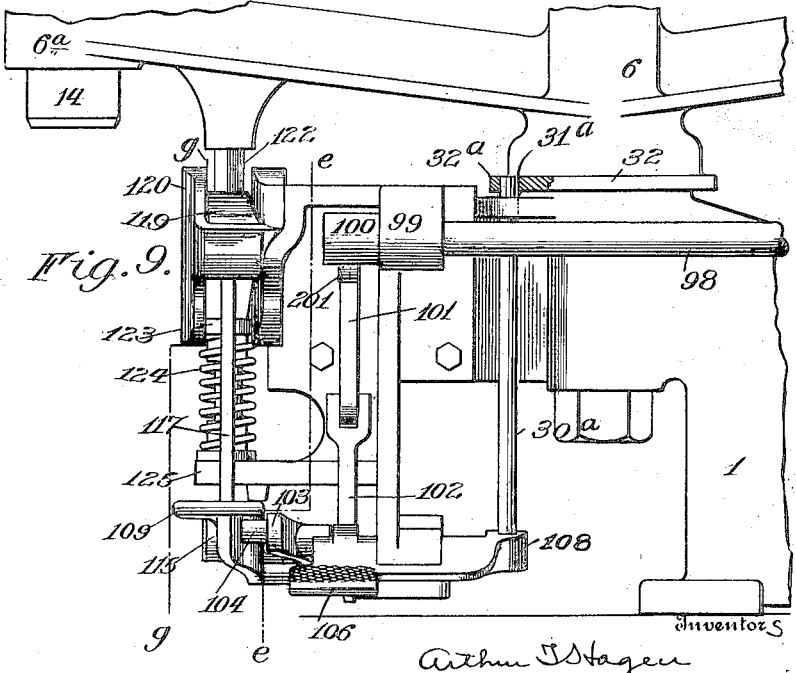

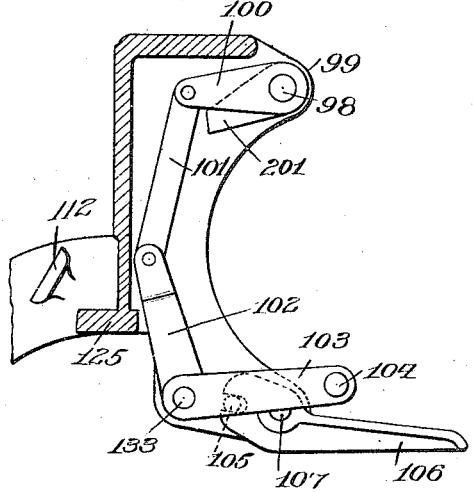

ARTHUR T. HAGEN AND DANIEL M. COOPER, OF ROCHESTER, NEW YORK, ASSIGNORS, BY MESNE ASSIGNMENTS, TO AMERICAN LAUNDRY MACHINERY COMPANY, OF CINCINNATI, OHIO, A CORPORATION OF OHIO.

IRONING-MACHINE.

1,115,187.   Specification of Letters Patent.   Patented Oct. 27, 1914.

Application filed September 15, 1905. Serial No. 278,624.

*To all whom it may concern:*

Be it known that we, ARTHUR T. HAGEN and DANIEL M. COOPER, of Rochester, in the county of Monroe and State of New York, have invented certain new and useful Improvements in Ironing-Machines; and we do hereby declare the following to be a full, clear, and exact description of the same, reference being had to the accompanying drawings, forming a part of the specification, and to the reference-numerals marked thereon.

Our present invention relates to laundry machinery and has for its object to provide an improved apparatus for pressing or ironing shirt bosoms of that class embodying a work support or ironing table and a heated platen or ironing surface, which are relatively movable to bring the iron and garment in contact for any desired length of time, and it has for its further object to provide an improved machine embodying a plurality of work supports adapted to be brought into alinement with the iron and means for operating and controlling the parts whereby the pressing operation is accomplished in the best manner, and the various operating parts are easily controlled and actuated.

The invention has for its further object to provide in a machine of this character an improved form of hydraulic elevating mechanism for operating the work supports, together with controlling devices which coöperate with the work supports for governing its operation.

To these and other ends the invention consists in certain improvements and combinations of parts all as will be hereinafter more fully described, the novel features being pointed out in the claims at the end of the specification.

In the drawing: Figure 1 is a plan view of a machine embodying our invention. Fig. 2 is a front view of the same with the work support and ironing platen in section. Fig. 3 is a vertical sectional view of the lower portion of the machine showing the hydraulic operating mechanism. Fig. 4 is a side elevation of one of the work supports with the lower portion in section showing the connection with the rotary carrier. Fig. 5 is a detail sectional view on the line $a$—$a$ of Fig. 2. Fig. 6 is a vertical sectional view on the line $b$—$b$ of Fig. 2. Fig. 7 (Sheet 2) is a section on the line $c$—$c$ of Fig. 3. Fig. 8 is a plan view of the operating and controlling treadles. Fig. 9 is a front view of the same. Fig. 10 is a horizontal sectional view on the line $d$—$d$ of Fig. 14. Fig. 11 is a vertical sectional view on the line $e$—$e$ of Fig. 9 with the parts shown in the position when the plunger is being operated. Fig. 12 is a similar view showing the position of the parts when the machine is at rest. Fig. 13 is a sectional view on the line $f$—$f$ of Fig. 3. Fig. 14 is a sectional view on the line $g$—$g$ of Fig. 9. Fig. 15 is a transverse vertical section through a work support.

Similar reference numerals in the several figures indicate similar parts.

The main frame of the machine embodies in the present construction, a base frame or casting indicated by 1, from one end of which extend the vertical standards 2 (two in the present instance) and from the other end extends a standard 3, said standards being connected at their upper ends to a yoke or cross beam 4 to the under side of which is bolted or otherwise secured, a steam chest or chamber 5, the lower surface of which is smoothed and polished to form the iron or platen with which the articles are brought in contact.

6 indicates a frame or carrier sleeved upon the standard 3 and capable of rotation thereon and having at its lower end a bearing plate 7 resting upon the antifriction balls 8 operating in recesses in the plate 9, said balls resting upon a bearing plate 10 secured to a boss on the frame 1, as shown particularly in Fig. 5. This carrier frame is provided with a plurality of radially-extending arms 6ª (two in the present instance) each carrying at its outer end a vertically movable ironing board or work support, embodying a lower plate 11, a narrow standard 12 and an upper plate 13. Secured to or formed upon the lower side of the bottom plate 11 is a guide or extension 14 vertically movable in a corresponding recess formed in the end of the arm 6ª of the carrier, and said plate 11 is further provided with an auxiliary pin or projection 15 movable in a corresponding aperture in an extension 16 of the carrier frame 6, as shown particularly in Fig. 4, the construction being such that the work support is permitted a vertical movement on the carrier, but is guided to move in right lines to permit the work to be brought in contact with the lower surface of the iron 5 and firmly pressed in contact therewith. The usual shield or guard 150 is also attached to the plate 11 to protect the garment from contact with the operating parts. The upper plate or bosom board 13 is hollow and its upper surface is provided with a plurality of small apertures or passages extending through it and connecting with the interior. The standard 12 is also hollow, as is the extension 14, the passage in the latter being connected by a pipe 17 passing out through a slot 18 in the socket or guide on the carrier, and connected by a flexible tube 19 with an annular chamber 20 in the lower portion of the central bearing of the carrier 6 around the standard 3.

21 indicates a perforated ring or collar located in the frame 1 around the standard 3 to form an air passage from the lower chamber 22 inside the ball bearing, so that air entering said chamber 22 through the pipe 23 may pass through the central bearing portion or sleeve outwardly and upwardly through the apertures in the surface of the plate 13, which latter is provided, as usual, with a padded covering to receive the work, preferably composed of one or more sheets 25 of felt or similar material, covered with one or more layers of fabric 26, as cotton, secured in place by a removable frame 27. At one end of the ironing table and extending above the surface of the latter is a neck band support 28 with which coöperates a neck band clamp 29 of any suitable construction, but preferably carried on the end of an arm 30 pivoted to an arm 31 secured to the lower plate 11. Also secured to this arm 31 is a shoulder clamp 32 which may be as shown or of any suitable construction, and at the opposite end of the board is a tail clamp, also of any suitable construction, but preferably of such nature that the tail of the shirt may be clamped thereto and stretched longitudinally of the board or plate 13.

The particular construction of the neck band clamp, shoulder clamp and tail clamp is immaterial so far as the present invention is concerned, and therefore specific description is not necessary. So far the description has been confined to one of the work supports or ironing tables located upon one of the arms 6ª of the rotary carrier 6, but as both ironing tables are the same and each is permitted an independent vertical movement of the carrier arm when beneath the iron, the construction and manner of operation of the parts will be understood.

The air passages described and extending from the main frame 1 up through the padded work support, permit the passage of air out through the pad of the support, serving to remove the steam and dampness derived from the shirt during the pressing operation, and also when the ironing table is swung out from beneath the iron and while the garment is being applied and removed. The air for this purpose is introduced into the pipe 23 preferably in a series of pulsations by means presently described, which passing through the pad, serves, in addition to the removal of the moisture, to intermittently lift the felt and its covering slightly, preventing them from becoming matted and keeping the felt lively and elastic, so that the pads will not require to be changed even after many hours of continuous work.

The carrier is adapted to be rotated on the standard by hand and is locked in position with one of the bosom boards beneath the steam heated platen or iron by means hereinafter described.

The means employed for operating the ironing board and the work into contact with the heated platen 5, consists of a hydraulic piston or plunger 35 arranged beneath the heated platen and operating in a cylinder 36, forming part of a casting or frame 37, secured in the base of the machine, said base being provided with a recess or chamber 38 adapted to contain a quantity of liquid, such as oil, and the casting or frame 37 being provided with a flange 39 resting on the upper edge of this chamber and secured thereto by suitable bolts at that end, and at the other end being secured to the bottom of the frame by bolts as 40. The piston 35 is provided with suitable packing 41 secured in position by a plate 42, which latter is in turn held by a bolt 43 projecting beyond the end of the main piston and constituting a smaller piston fitting within a small cylinder 44 axially in line with the former. Formed within the casting 37 is a small passage 45 leading from the lower end of the larger cylinder into the side of the smaller cylinder 44 above its lower end, and the bottom of said cylinder 44 is in communication with a longitudinal passage 46 leading to the opposite end of the casting and communicating with the cylinder of a hydraulic force pump. Extending laterally from the main cylinder 36 is a passage 47 having a port opening into the chamber 38 closed by a downwardly closing valve 48, the stem of which is adapted to be engaged by an arm 49 secured to, or forming part of, a rod 50 to which is applied a heavy weight 51. The lower end of this rod is provided with a conical head 52 constituting a valve adapted to close, when in its lowermost position, a small passage 53 leading from the passage 46 into the oil chamber 38, this rod 50 and the valves operated thereby forming a releasing device for permitting the descent of the plunger 35, as will be described. The valve 48 is made separate from the rod 50 in order that it may have a slight independent movement to open the valve 52 prior to opening valve 48, but the weight controls the closing of the valve 48 because it must descend before the valve is permitted to close. The force pump for drawing the oil from the chamber 38 and forcing it into the passage 46 embodies a cylinder 54 secured to the casting 37 and in connection with the chamber 55 therein 56 indicating the inlet check valve upwardly opening, and 57 the corresponding discharge valve between the chamber 55 and the passage 46, so that at each upward reciprocation of the pump plunger 58, the oil will be drawn in through the passage controlled by the check valve 56 and discharged at each downward reciprocation through the passage controlled by the check valve 57. The piston 58 of the oil pump is connected to, or forms part of, a rod or plunger 60, extending upwardly parallel with the standards 2, beside the latter, and pivoted at its upper end to a pitman 61 connected to a crank 62 on a main operating shaft 63, supported in suitable bearings and provided in the present instance with the usual fast and loose belt pulleys 64, 65. The rod 60 also passes axially through a cylinder 70, suitable stuffing boxes 71 being provided at each end, and in said cylinder it is connected to a piston 72 employed for forcing air into the ironing tables, and while this air pump or forcing device may be of any suitable construction, we prefer to employ the valve arrangements shown in Fig. 6, 75 indicating the inlet valves and 76 the outlet valves, leading to the pipe 77 connected by the pipe or passage 78 with the pipe 23 at the base of the carrier, as shown particularly in Figs. 1, 5 and 6. While we prefer, for the reasons before stated, to force air under pressure into the ironing boards, it will be obvious that by a simple reversal of the valves of the pump, the steam and vapor could be sucked from beneath the pads in order to keep the latter dry, but we find in practice that by forcing the air through, as described, the pads are kept in better condition.

In order that the movement of the press plunger may be controlled at all times by the operator and the proper coördination between the movement of the carrier for the ironing board and of the plunger accomplished, we provide means in the form of two pedals to be actuated by the operator, and an automatic device so arranged and related that even an unskilled operator may operate the machine without danger to himself or to the apparatus.

Referring particularly to Figs. 3 and 7, 80 indicates a cross bar arranged beneath the stem of the inlet valve 56 of the hydraulic pump, said bar being guided by links 81 and connected at its ends to a yoke frame formed by the arms 82 connected to a head 83 on a link or rod 84, said link 84 being provided with elongated slots 85 and 86. Arranged in the slot 85 is a cross pin 87 secured to a lever 88 pivoted at 89 to the casting 37 and having at its opposite end a hollow weight 90 guided in its vertical movements by a guide 91 preferably formed on the lower end plate of the air pump cylinder 70. This lever 88 rests near its fulcrum upon a piston or plunger 92 having its lower end in the passage 46 leading from the hydraulic pump to the main cylinder. Operating in the slot 86 in the rod 84 is a pin 93 (Fig. 7) secured in the forked end of a lever 94 pivoted at 95 to the weighted rod 50, and pivotally connected near said pivot to a hanger 96, pivoted to the end of a lever 97 secured rigidly to a shaft 98 mounted in bearings 99 and extending longitudinally of the base of the machine, outside of the chamber therein. To one end of the shaft 98 is connected a crank 100 (Figs. 11 and 12) to which is pivoted a link 101, constituting with an arm 102, pivoted thereto, a toggle, said arm 102 being connected to or forming part of a lever 103, pivoted at 133 and provided on one side of its pivot with a stud 104, and on its inner side nearer the pivot, with a stud 105.

201 indicates a stop with which the link 101 coöperates when in the position shown in Fig. 12, holding the toggle extended and the lever 100 elevated.

106 indicates a treadle or starting lever pivoted at 107 and having the short rearwardly-extending portion slotted for the reception of the pin 105 on the lever 103, so that when said treadle is depressed and the parts moved from the position shown in Fig. 12 to that in Fig. 11, the toggle composed of the link 101 and arm 102 will be broken and the weight will cause the parts to be turned back to the position shown in said last mentioned Fig. 11. This lever 106 also has a longer rearward extension or arm 108 to which is connected a vertically-movable rod 38 guided in the main frame, and when moved upwardly adapted to coöperate with one of the apertures 31ª formed in the flange 32ª at the lower end of the bearing sleeve of the rotary carrier 6, as shown particularly in Figs. 2, 8 and 9, the relation of these parts being such that the treadle 106 cannot be depressed and the rod elevated until one of the apertures 31ª is in line with the pin 30ª, and therefore an ironing board properly positioned beneath the heated platen, the flange and pin thus serving as an automatic interlocking device, preventing the improper operation of the plunger of the press, inasmuch as the downward movement of this treadle starts the plunger in its upward movement, as will be described. Arranged in proximity to the lever 106 is the carrier releasing treadle or lever 109, pivoted at 110 upon a suitable frame, and provided with an upwardly-extending arm 111, between which and a stationary projection 112 is arranged an adjustable spring 113, serving to maintain the lever 109 normally in the position shown in Fig. 14. This lever 109 is also provided at its inner side with a flange projecting over and engaging the pin 104 on the lever 103, so that when the treadle is depressed, the lever 103 and the toggle connected thereto, will be straightened or moved to the position shown in Fig. 12, with the link against the stop 201 and the plunger operating the ironing board will be allowed to descend.

115 indicates a lever pivoted upon the treadle or lever 109 at 116, and connected at its ends to links 117, which latter are in turn pivoted at 118 to stop blocks 119, guided for vertical movement in a frame 120, and having their upper surfaces rounded or inclined as shown in Fig. 14. The adjacent edges of the blocks 119 are recessed at 121 to form a socket for the reception of locking pins or projections 122 formed upon the lower side of the arms 6ᵃ of the carrier 6, (see Fig. 2), and serving to lock the carrier in proper position with one or the other of the ironing boards in line with the platen. The locking heads or blocks 119 are supported upon a collar 123 resting upon a spring 124 supported upon the bracket 125, said collar 123 being guided upon a bolt 126 secured to the bracket 125 and projecting upwardly into the lower end of the recesses 121 in the adjacent walls of the blocks 119. The spring 113 is stronger than the spring 124 and the lever 109 is maintained in the position shown in Fig. 14, and the carrier locked from rotation by the engagement of one of its pins 122 with the blocks, but upon the depression of the lever 109 both the blocks 119 are moved downward permitting the carrier 6 to be rotated in either direction, and when said lever is released again, the blocks will return to normal position and when the carrier is rotated to bring one of the studs 122 into engagement with one of the blocks 119, it will by reason of the inclined surface, depress it against the tension of the spring 124 at the same time through the links and lever 115, raising the other block above the normal level so that it will constitute a stop against which the pin 122 will strike to insure the proper positioning of the carrier, then when said pin enters the socket, or passes off the block first engaged, it will be held in the socket by both jaws and rotary movement of the carrier prevented. The operation of the machine just described will now be readily understood.

When adapted for operation, the platen 5 is heated by steam or by gas burners if desired, in the usual or any preferred manner and power being applied to the shaft 63, the rod to which the pistons of the air and liquid pumps is reciprocated, the former forcing air through the ironing board or work supports in the manner described, or if desired, withdrawing it therefrom. Although the plunger of the liquid pump is operating continuously, the liquid is not forced into the cylinder 36, excepting when the piston and ironing board are to be elevated, because the cross bar 80 is held elevated, raising the inlet valve 56 and opening free communication between the pump cylinder and the fluid receptacle 38. This valve 56 is held open by reason of the elevation of the yoke frame comprising members 82—84, connected to the lever 94, the arm 97 being elevated; the shaft 98 rotated and held by the toggle comprising members 101—102, the treadle 109 having been depressed and released, allowing the stop blocks 119 to be moved upwardly by their spring and engaging the locking pin 122 on the carrier 6. When, now it is desired to elevate the piston 35 and the ironing board which is above it and in line with the platen, the operator moves the treadle 106 to the position shown in Fig. 11, thereby breaking the toggle 101, 102 as shown in said figure, and the weight 51 causing the shaft 98 to rotate, dropping the lever 94 and permitting the valve 56 to close at each downward stroke of the pump plunger, but to open at each upward stroke, causing the liquid to raise and pass the valve 57 and enter the passage 46, thence acting on the small piston 44 to quickly raise the latter until the passage 45 is open and the liquid can pass directly under the main piston 35, causing the latter and the work support to be raised more slowly and with greater power by hydraulic pressure. As the lever 106 is connected to the rod 30, and the upper end of the latter is beneath the flange 32 on the carrier, it will be seen that said starting treadle cannot be moved until the aperture 31 is in line with said rod thereby insuring the proper positioning of the carrier and ironing board, before the piston 35 can be moved.

When the garment is seated against the iron and the desired pressure has been obtained, the plunger 92 of the presser regulator in the passage 46 will be raised lifting the lever 88 and causing the pin 87 therein to engage the rod 84 of the yoke, lifting again the valve 56 (which then serves as a pump relief valve) and holding it open so that no more fluid will be supplied to the main piston. This lifting of the yoke does not operate the lever 94 by reason of the loose connection between the pin 93 and the slot 86, so that the desired pressure will be maintained between the work and the iron for any desired length of time, and the amount of the pressure may be increased or diminished by the insertion or removal of small weights from the larger weight 90 connected to the lever 88.

When the pressing operation is finished, the operator presses upon the treadle 109, and through the pin 104 and lever 103, straightens the toggle again, turning the shaft 98, raising the arm 97 and the lever 94, and also the weighted rod 50 which controls the exit passage from the cylinder 36. When the rod 50 is first lifted, it uncovers the small exit port 53, releasing the pressure in the passage 46, and its further upward movement lifts the relief valve 48, allowing the liquid under the piston 35 to pass back into the receptacle 38, and said piston 35 and the work support thereon to return to lowermost position. When the lever 94 is lifted in the manner described and held by the toggle, the valve 56 is also held open, and the parts are then in position ready for the rotation of the carrier to bring another work support between the iron and the plunger.

From the above it will be seen that the device is relatively simple in construction, and is capable of operation by an unskilled operator, the only things necessary for him to accomplish being the proper manipulation of the two treadles, the application of the garment from one ironing board while it is away from the heated platen, and the rotation of the carrier,—the interlocking of the parts being such that there is no possibility of improper operation and resulting damage to the machine. It will be understood that the pressure exerted between the garment and iron is uniform irrespective of wear of the parts, and therefore this pressure may be regulated to suit the work by the person in charge of the machine adding to or removing weights from the lever 88 to produce that best adapted for the work.

The employment of a perforated support for the pad and the creation of air currents through the latter is particularly advantageous in an ironing apparatus in which the goods are required to remain for a greater or lesser length of time in contact with the heated iron, so that the steam and moisture will be removed and the parts kept relatively dry, and this will be the same under all conditions whatever may be the thickness of the pad or of the garment.

We claim as our invention:

1. In an ironing machine, the combination with a main frame, a platen thereon, a pressing cylinder and piston and a hollow work support adapted to be inserted between the platen and piston, of a liquid pump cylinder and passages between it and the pressing cylinder, an air pump cylinder and passages between it and the interior of the work support and the connected pistons operating in the liquid and air pump cylinders.

2. In an ironing machine, the combination with a platen and a lifting device beneath it, of a carrier pivoted on a vertical center and having an air chamber therein, a plurality of independently vertically movable hollow work supports thereon each communicating with said chamber and adapted to be moved successively beneath the platen, said work supports having air outlet perforations in their upper faces and means for supplying air under pressure to the carrier chamber in all positions of rotary adjustment.

3. In an ironing machine, the combination with the main frame, having an annular air chamber thereon, of a rotary carrier pivoted on the frame having an air chamber coöperating with that on the frame, a plurality of hollow work supports provided with perforated faces and air passages connecting the interior of the supports with the chamber in the carrier and means for supplying air under pressure to the chamber in the frame.

4. In an ironing machine, the combination with the main frame having an air chamber and the platen on the frame, of the carrier rotatably mounted on the frame and having a central air chamber communicating with that of the frame, a plurality of independently movable hollow work supports on the carrier having their faces provided with air outlet perforations, flexible air pipes between the supports and the central air chamber of the carrier and a pump supplying air under pressure to the chamber in the frame.

5. In an ironing machine, the combination with a platen, a work support and mechanism for moving them relatively toward and from each other, of a controlling means for said mechanism embodying an oscillatory shaft and means for operating it in one direction, a toggle comprising jointed arms connected to the shaft, a stop for holding the toggle straightened and operating parts for flexing the toggle in opposite directions.

6. In an ironing machine, the combination with a platen, a laterally movable carrier, a plurality of work supports on the carrier and operating mechanism for causing the relative approach and separation of the platen and one of the work supports, of a controlling device for said operating mechanism, a lock for the carrier and a movable member for releasing said lock and coöperating with the controlling device to cause the separation of the work support and platen when the carrier is unlocked.

7. In an ironing machine, the combination with a platen, a laterally movable carrier, a plurality of work supports on the carrier and operating mechanism for moving the platen and work supports relatively toward and from each other, of a controlling device for said mechanism, a lock for the carrier and a movable actuating member for operating the controlling device and releasing the carrier lock, said parts being arranged to first cause the separation of the platen and support and then release the carrier.

8. In an ironing machine, the combination with a platen, a laterally movable carrier, a plurality of work supports on the carrier and operating mechanism for moving the platen and supports relatively toward and from each other, of a controlling device for said mechanism, a lock for the carrier, a movable member coöperating with the controlling device and carrier lock and operating when moved in one direction to first cause the separation of the platen and support and then release the carrier and another movable member for also actuating the controlling device to cause the approach of the platen and support independently of the carrier lock and with which the carrier coöperates to prevent movement of said last mentioned member excepting when a work support is in proper position relative to the platen.

9. In an ironing machine, the combination with a platen, a laterally movable carrier, a plurality of work supports thereon and operating mechanism for causing the relative movements of a support and platen toward and from each other, of an oscillatory shaft controlling the operation of said mechanism, a lever and a toggle connection comprising pivoted arms arranged between the lever and said shaft, a lock for the carrier, a pedal for releasing the lock and actuating the toggle arms in one direction, and a pedal coöperating with the lever to actuate said arms in the other direction.

10. In an ironing machine, the combination with a platen, a laterally movable carrier, a plurality of work supports thereon and operating mechanism for causing the relative movements of a support and platen toward and from each other, of an oscillatory shaft controlling the operation of said mechanism, a lever, a toggle connection comprising pivoted arms arranged between the lever and said shaft, a lock for the carrier, a pedal for releasing the lock and actuating the toggle arms in one direction, a pedal coöperating with the toggle arms to actuate them in the other direction and a device operated by said pedal and coöperating with the carrier for preventing the operation of the pedal excepting when a work support is in proper position relative to the platen.

11. In an ironing machine, the combination with the relatively movable platen and work support, and operating mechanism for moving them toward each other, of controlling devices for said mechanism embodying an oscillatory shaft, jointed toggle levers connected to said shaft and two pedals operating upon said toggle levers to flex them in opposite directions.

12. In an ironing machine, the combination with a platen, a movable carrier having a plurality of work supports thereon and operating mechanism for causing the relative movements of a work support and platen, of controlling devices for said mechanism embodying an oscillatory shaft and toggle levers connected thereto, a lock for the carrier and two pedals coöperating with the toggle levers to flex them in opposite directions, one of said pedals coöperating with the carrier lock to release it.

13. In an ironing machine, the combination with a platen, a movable carrier having a plurality of work supports thereon and operating mechanism for causing the relative movements of a work support and platen, of controlling devices for said mechanism embodying an oscillatory shaft, and toggle levers connected thereto, a lock for the carrier and two pedals coöperating with the toggle levers to flex them in opposite directions, one of said pedals coöperating with the carrier lock to release it and the other adapted to coöperate with and to be arrested by the carrier at all times excepting when the support is in proper position relative to the platen.

14. In an ironing machine, the combination with a platen, a movable carrier having a plurality of work supports thereon and operating mechanism for causing the relative movements of a work support and platen, of controlling devices for said mechanism embodying an oscillatory shaft, and toggle levers connected thereto, a lock for the carrier, and starting and releasing pedals, the former serving to flex the toggle in one direction and being also adapted to coöperate with the carrier to lock it and to be arrested at all times by the carrier, excepting when the latter is in proper position relatively to the platen, the releasing pedal serving to flex the toggle in the opposite direction and to restore the starting pedal to its normal position.

15. In an ironing machine the combination with a platen, a relatively movable carrier, a plurality of work supports thereon adapted to separately coöperate with the platen, of a holding device for the carrier embodying two yielding stops connected for simultaneous movement in opposite directions, said carrier being adapted to engage one of the stops when moved in either direction.

16. The combination with the movable carrier having a locking projection thereon, of the two spring operated stops having beveled faces and connected for simultaneous movement in opposite directions.

17. The combination with the movable carrier having a locking projection thereon, of the two stops having beveled faces and connected for simultaneous movement in opposite directions and means for moving both of said stops out of engagement with the projection.

18. The combination with the movable carrier having a locking projection thereon, of a frame, two stops guided therein having the beveled faces, the spring operating on the stops, the links pivoted to the stops and the lever pivoted to the links.

19. The combination with the movable carrier having a locking projection thereon, of a frame, two stops guided therein having the beveled faces, the spring operating on the stops, the links pivoted to the stops, the lever pivoted to the links and the movable support for the lever operating to retract both stops simultaneously.

20. The combination with the movable carrier having a locking projection thereon, of a frame, two movable stops therein the spring coöperating with the stops, the operating lever, the lever pivoted thereon and the links connecting the opposite ends of the last mentioned lever with the respective stops.

ARTHUR T. HAGEN.
DANIEL M. COOPER.

Witnesses:
ISAAC A. WILE,
E. F. UNDERHILL.